US011028688B2

(12) United States Patent
Giron et al.

(10) Patent No.: US 11,028,688 B2
(45) Date of Patent: Jun. 8, 2021

(54) OPTICAL SPLASH COMMUNICATION IN DOWNHOLE APPLICATIONS

(71) Applicant: Halliburton Energy Services, Inc., Houston, TX (US)

(72) Inventors: Casey Giron, Danville, CA (US); Wolfgang Hartmut Nitsche, Humble, TX (US); John Laureto Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 276 days.

(21) Appl. No.: 16/305,314

(22) PCT Filed: Jul. 11, 2016

(86) PCT No.: PCT/US2016/041725
§ 371 (c)(1),
(2) Date: Nov. 28, 2018

(87) PCT Pub. No.: WO2018/013075
PCT Pub. Date: Jan. 18, 2018

(65) Prior Publication Data
US 2020/0240262 A1 Jul. 30, 2020

(51) Int. Cl.
*E21B 47/135* (2012.01)
*E21B 47/12* (2012.01)
*H04B 10/80* (2013.01)
*H04B 10/116* (2013.01)

(52) U.S. Cl.
CPC ............ *E21B 47/135* (2020.05); *E21B 47/12* (2013.01); *H04B 10/116* (2013.01); *H04B 10/803* (2013.01)

(58) Field of Classification Search
CPC ..... E21B 47/135; E21B 47/12; H04B 10/803; H04B 10/116
See application file for complete search history.

(56) References Cited

U.S. PATENT DOCUMENTS 4,928,088 A 5/1990 Jorion et al.
7,949,259 B2 5/2011 Suzuki
(Continued)

FOREIGN PATENT DOCUMENTS

EP 2339762 A1 6/2011
EP 2744124 A1 6/2014
(Continued)

OTHER PUBLICATIONS

International Search Report and Written Opinion issued in related PCT Application No. PCT/US2016/041725 dated Mar. 20, 2017, 15 pages.
(Continued)

*Primary Examiner* — Leslie C Pascal
(74) *Attorney, Agent, or Firm* — Thomas Rooney; Baker Botts L.L.P.

(57) ABSTRACT

To optimize the efficiency and reliability of downhole data transmissions, an optical splash communication system may be utilized. A downhole tool may include an optical splash communication system that comprises multiple electrical elements where the electrical elements communicate with each other by transmitting and receiving via free space an optical splash signal through an inner space of the downhole tool. The electrical elements may comprise or be coupled to a light source and a detector. Multiple optical splash communication systems may be deployed in multiple downhole tools such that each downhole tool may communicate with another downhole tool via an opening, for example, a transparent sealed window, between the downhole tools. The opening is sufficient to permit transmissions to occur even when the downhole tools are rotated independently of each other.

16 Claims, 6 Drawing Sheets

(56) References Cited

U.S. PATENT DOCUMENTS

| | | |
|---|---|---|
| 8,131,154 B2 | 3/2012 | Murayama et al. |
| 8,521,035 B2 | 8/2013 | Knapp et al. |
| 8,750,719 B2 | 6/2014 | Yamada et al. |
| 8,873,965 B2 | 10/2014 | Giustiniano et al. |
| 2004/0264972 A1 | 12/2004 | Killinger |
| 2005/0284659 A1 | 12/2005 | Hall et al. |
| 2006/0288769 A1 | 12/2006 | Odom |
| 2009/0114014 A1 | 5/2009 | Csutak |
| 2011/0044697 A1* | 2/2011 | Peter .................. E21B 47/135 398/140 |
| 2012/0093517 A1 | 4/2012 | Rajagopal et al. |
| 2013/0016978 A1 | 1/2013 | Son et al. |
| 2016/0208603 A1* | 7/2016 | Barfoot ............ H04B 10/25891 |
| 2017/0204725 A1* | 7/2017 | Lines .................. E21B 47/135 |

FOREIGN PATENT DOCUMENTS

| | | | |
|---|---|---|---|
| JP | 58200642 A | * 11/1983 | ........... H04B 10/803 |
| WO | 2014/158949 A1 | 10/2014 | |
| WO | WO-2015126535 A2 | * 8/2015 | ......... H04Q 11/0005 |

OTHER PUBLICATIONS

Chow et al., "Visible Light Communication", Chapter 4 of Lee, Cheng-Chung, ed. The current trends of optics and photonics. vol. 129. Springer, 2014, pp. 107-121.

Afgani, Mostafa Z., et al. "Visible light communication using OFDM." Testbeds and Research Infrastructures for the Development of Networks and Communities, 2006. TRIDENTCOM 2006. 2nd International Conference on. IEEE, 2006.

Wang, Yuanquan, et al. "Demonstration of 575-Mb/s downlink and 225-Mb/s uplink bi-directional SCM-WDM visible light communication using RGB LED and phosphor-based LED." Optics express 21.1 (2013): 1203-1208.

Yeh, C. H., et al. "Investigation of 4-ASK modulation with digital filtering to increase 20 times of direct modulation speed of white-light LED visible light communication system." Optics Express 20.15 (2012): 16218-16223.

* cited by examiner

OPTICAL SPLASH COMMUNICATION IN DOWNHOLE APPLICATIONS

CROSS-REFERENCE TO RELATED APPLICATION

The present application is a U.S. National Stage Application of International Application No. PCT/US2016/041725 filed Jul. 11, 2016, which is incorporated herein by reference in its entirety for all purposes.

BACKGROUND

The present disclosure relates generally to well drilling operations and, more particularly, to an optical splash communication system for communication between different downhole tools.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Measurements of the subterranean formation may be made throughout the operations to characterize the formation and aide in making operational decisions. In certain instances, a communication interface of a downhole tool may be used to communicate data associated with measurements of the formation or other downhole parameters.

FIGURES

Some specific exemplary embodiments of the disclosure may be understood by referring, in part, to the following description and the accompanying drawings.

Figure 1:
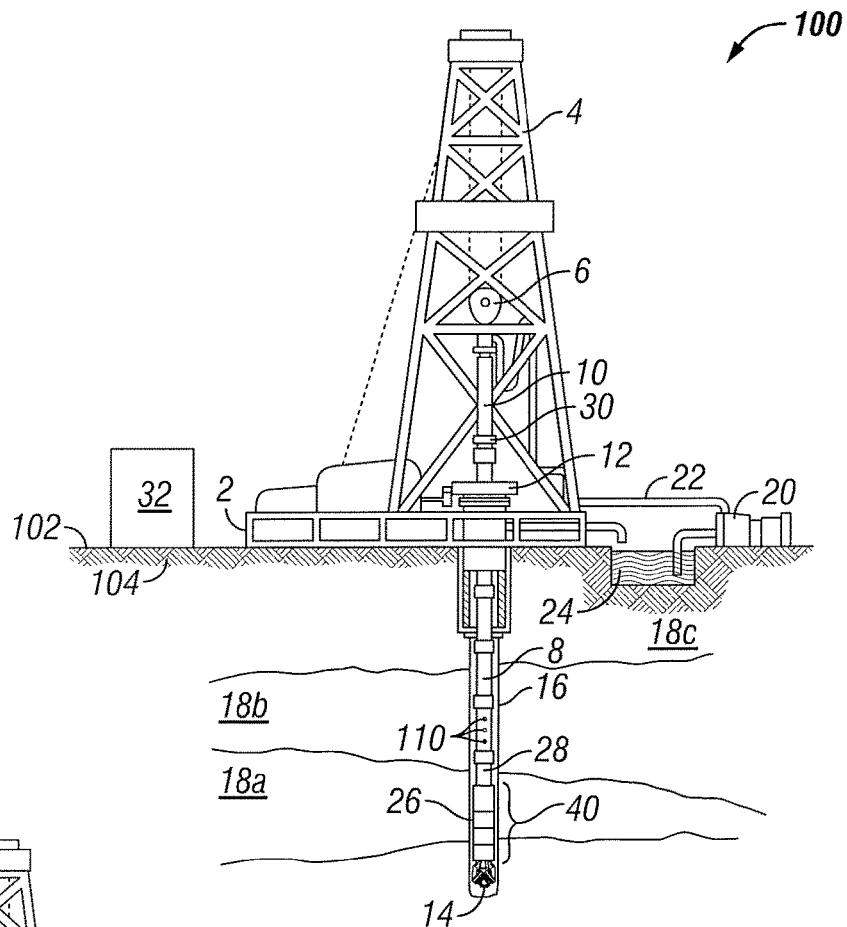
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Copper wires may be used within a downhole tool to communicate between electrical components and electrical tools. However, copper wires are prone to degrading over time along with the connectors used to connect multiple tools together. Providing an optical splash communication system that is independent of any cables or fibers reduces failures of enclosure or tool due to breakage or connector failures. Further, optical splash communications may not be affected by the presence of electric or magnetic fields that typically cause interference with signals sent over copper cabling. Using optical splash signals for communication effectively immunizes the optical splash communication system from inductive coupling, electromagnetic interference, and ground loops. In some embodiments, visible light is used to communicate data between downhole electrical components which minimizes the risk of detection of the data by unauthorized or unintended users. One or more embodiments of the present disclosure provide for downhole communications that are reliable and able to withstand the downhole environment.

FIG. 1 is a diagram of a subterranean drilling system 100, according to aspects of the present disclosure. The drilling system 100 comprises a drilling platform 2 positioned at the surface 102. In the embodiment shown, the surface 102 comprises the top of a formation 104 containing one or more rock strata or layers 18a, 18b, 18c, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 100 may comprise any number and types of downhole tools. In one or more embodiments, a bottom hole assembly (BHA) 40 coupled to the drill string 8 near the drill bit 14 may comprise one or more downhole tools. The BHA 40 may comprise various downhole measurement tools and sensors and LWD and MWD elements, including an optical splash communication system 26. In one or more embodiments, optical splash communication system 26 may be located anywhere along the drill string 8 and within or coupled to any tool. As will be described in detail below, the optical splash communication system 26 may communicate data between one or more components of a tool or between one or more components of one or more tools.

The tools and sensors of the BHA 40 including the optical splash communication system 26 may be communicably coupled to a telemetry element 28. The telemetry element 28 may transfer data from the optical splash communication system 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the data provided by the optical communication system 26 may also be stored downhole for later retrieval at the surface 102.

In certain embodiments, the drilling system 100 may comprise an information handling system 32 positioned at the surface 102. The information handling system 32 may be communicably coupled to the surface receiver 30 and may receive data from the optical splash communication system 26 and/or transmit commands to the optical splash communication system 26 through the surface receiver 30. The information handling system 32 may also receive data from any component of the BHA 40 or any one or more downhole tools of the drill string 8 when retrieved at the surface 102. As will be described below, the information handling system 32 may process the data to determine certain characteristics of the formation 104, including the location and characteristics of fractures within the formation 104 or any other downhole information.

Figure 2:
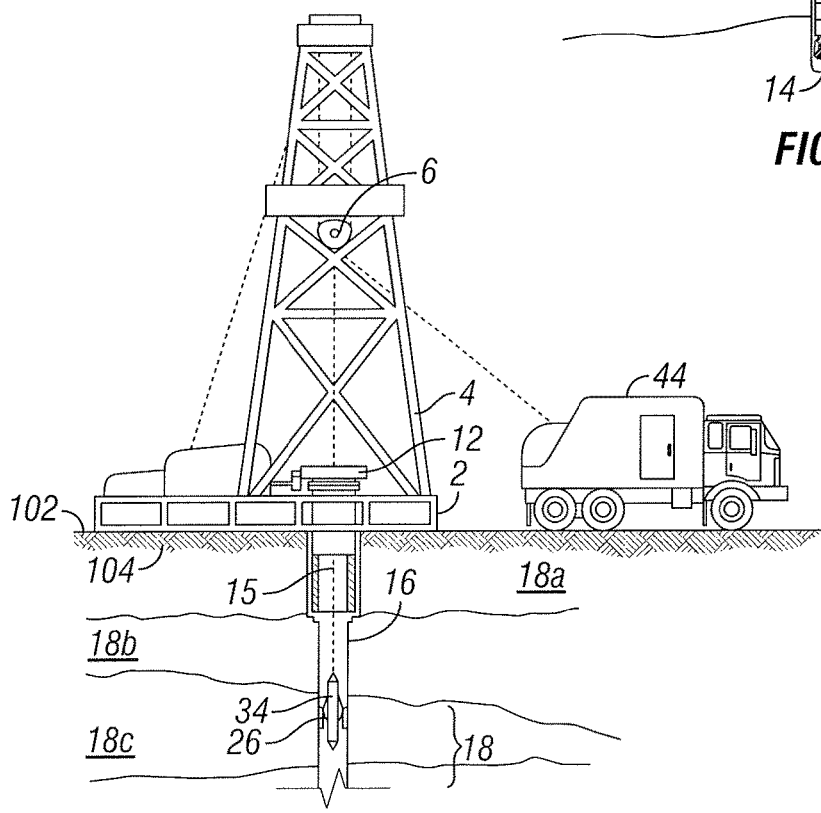
FIG. 2 is a diagram showing an illustrative wireline logging environment, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 34, for example, an instrument that is suspended into the borehole 16 by a cable 15 having conductors for transporting power to the tool and telemetry from the tool body to the surface 102. The wireline tool 34 may include an optical splash communication system 26. The optical splash communication system 26 may be communicatively coupled to the cable 15. A logging facility 44 (shown in FIG. 2 as a truck, although it may be any other structure) may collect data from the optical splash communication system 26, and may include computing facilities (including, for example, an information handling system) for controlling, processing, storing, and/or visualizing the data gathered by the optical splash communication system 26. The computing facilities may be communicatively coupled to the optical splash communication system 26 by way of the cable 15. In certain embodiments, the information handling system 32 may serve as the computing facilities of the logging facility 44.

Figure 3:
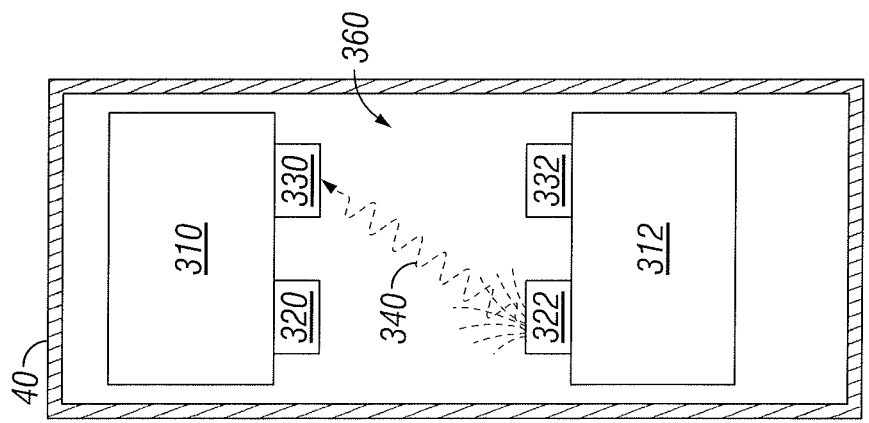
FIG. 3 is a diagram of an optical splash communication system, according to aspects of the present disclosure.

FIG. 3 is a diagram of an optical splash communication system 26. In one or more embodiments of the present invention, different electrical elements 310 and 312 may communicate with each other via an optical splash signal 340. The electrical elements 310 and 312 may be enclosed within a downhole tool, such as BHA 40, that is water-tight and filled with air. In one or more embodiments, each of the electrical elements 310 and 312 may be equipped with a light source 322, 320 including, but not limited to, a light-emitting diode (LED), a laser or any other suitable light source and a detector 332, 330 including, but not limited to, a photo diode or any other suitable light detector. For example, the electrical element 312 may transmit data via a light signal 340 by emitting modulated light. The detector 330 may receive the data by detecting the light signal 340. In one or more embodiments, the electrical elements 310 and 312 comprise a bidirectional communication system such that each electrical element 310 and 312 may both emit a light signal 340 and may receive a transmitted light signal 340. The light signal may be emitted, for example, in an omidirectional beam-pattern ensuring that some light from the light source 322 will reach the detector 330 without requiring any alignment. At least one inner space exists between electrical elements 310 and 312, for example, inner space 360. In one or more embodiments, optical splash signal 340 is transmitted via free space or independent of a fiber optic cable or fiber optic line. In one or more embodiments, the optical splash signal 340 may be a visible light signal. In one or more embodiments, the optical splash signal 340 may be emitted by an infrared LED.

In one or more embodiments, any one or more of the electrical elements 310 and 312 may comprise any one or more of light sources 320, 322 and detectors 330, 332. In one or more embodiments, the light source 320 or 322 may also act as a detector 330, 332. For example, a light source 320 may be an LED that emits light and receives light. In one or more embodiments, electrical element 310 may be moved, adjusted, or otherwise altered in relation to electrical element 312 without disrupting the communication of the optical splash signal 340 between the electrical elements 310 and 312.

In one or more embodiments, digital data is encoded in the optical splash signal 340. For example, digital data received downhole from one or more sensors or receivers 110 may be encoded in the optical splash signal 340. Sensors or receivers 110 may be located at any downhole tool and may be located at or near drill bit 14, wireline tool 34, within optical splash communication system 26, or any other suitable location. The encoded data may comprise one or more downhole parameters, drilling parameter, formation parameters, determined parameters, ranging parameters, any other downhole formation, or any combination thereof. For example, the encoded data may comprise a temperature, velocity of drilling, a speed of drilling, an angle of drilling, a rotation of drilling, a parameter associated with a target object, a resistivity measurement, or any other downhole information. One or more drilling parameters or drilling operations may be adjusted, based, at least in part on the encoded data.

The encoding may comprise any number of approaches or schemes, including lower data rate schemes such as Morse Code or higher data rate schemes such as quadrature amplitude modulation (QAM). For example, using QAM, the power p which an LED emits at the time t is:

$$p(t) = p_0 + \alpha_1(t)\sin(2\pi f_1 t) + \beta_1(t)\cos(2\pi f_1 t) + \qquad \text{(Equation 1)}$$
$$\alpha_2(t)\sin(2\pi f_2 t) + \beta_2(t)\cos(2\pi f_2 t) + \ldots$$
$$= p_0 + \sum_{n=1}^{N} (\alpha_n(t)\sin(2\pi f_n t) + \beta_n(t)\cos(2\pi f_n t))$$

Figure 8:
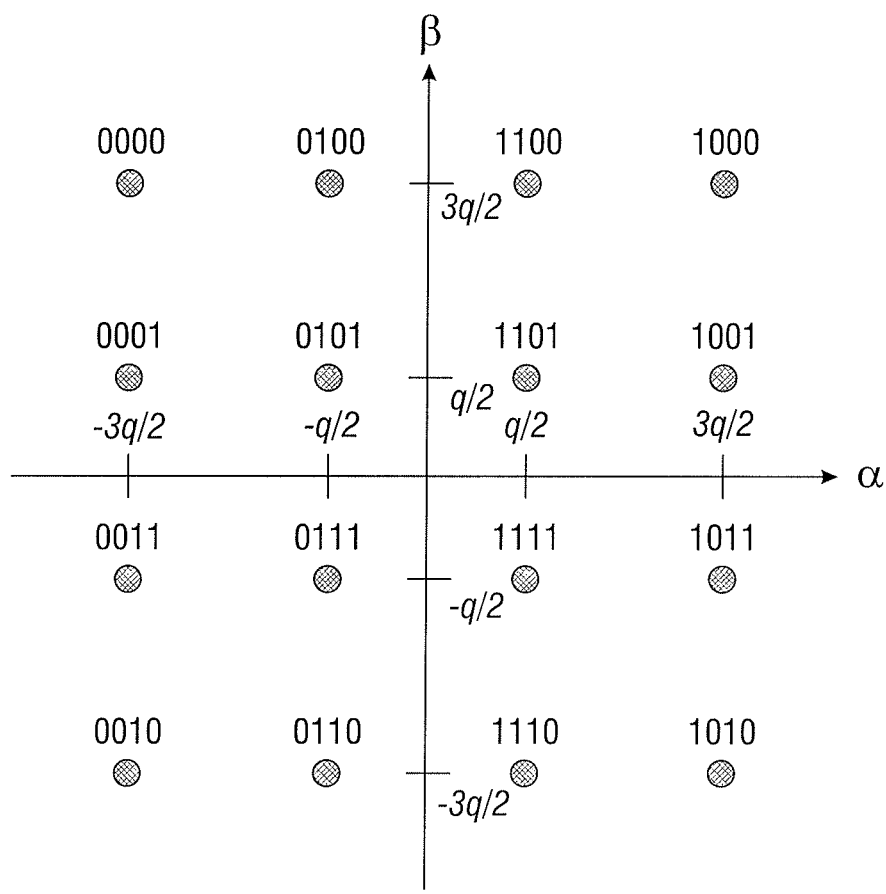
FIG. 8 is a diagram for QAM modulation of an optical splash signal, according to one or more aspects of the present invention.

Each of the $\alpha_n(t)$ and $\beta_n(t)$ may be set to M discrete power levels $p_1, p_2, \ldots p_M$. Each of these power levels may be calculated as $$p_m = \left(m - \frac{M}{2} - \frac{1}{2}\right)q$$

and q should be chosen in such a way that $qMN \lesssim p_0$. Thus, there are N subcarriers and each of them transmits $\log_2(M^2)$ bits per symbol as illustrated in the constellation diagram of FIG. 8. In FIG. 8, the constellation diagram is for a rectangular 16-QAM, where M=4 and each of the sixteen possible symbols corresponds to 4 bits of information. In other embodiments, a non-rectangularity constellation may be used. The sub-carrier frequencies $f_1, f_2, \ldots, f_N$ could be chosen in such a way that crosstalk is reduced through orthogonal frequency division multiplexing.

In one or more embodiments, K different colors of light may be used. For example, red, green and blue LEDs corresponding to K=3 may be used. Each of these light colors acts as a different carrier and all may independently be modulated with QAM. A total of KN $\log_2(M^2)$ bits may be transmitted at the same time. With K=3 light colors, ten subcarriers for each of the light colors, and using 16-QAM with $M^2=16$ and M=4, then KN $\log_2(M^2)=3\times10$ $\log_2(16)=$ 120 bits at once may be transmitted. In any one or more embodiments, K, N, and M may be increased to increase the data rate.

On occasion, multi-path interference may occur. For example, if two different paths with a path length difference of $\Delta L$ contribute equal power to the detected signal, then the subcarrier with a frequency of $$\frac{c}{2\Delta L}$$

disappears. Other subcarriers may be used and therefore it is not significant if one specific subcarrier becomes useless due to multipath interference. Also, if the total size of the system through which the data is transmitted is much smaller than the shortest subcarrier wavelength $$\frac{c}{f_n},$$

then multipath interference is unlikely to cause any significant problems. Standard error correction procedures may then be used as is typical in digital communications links.

Figure 4:
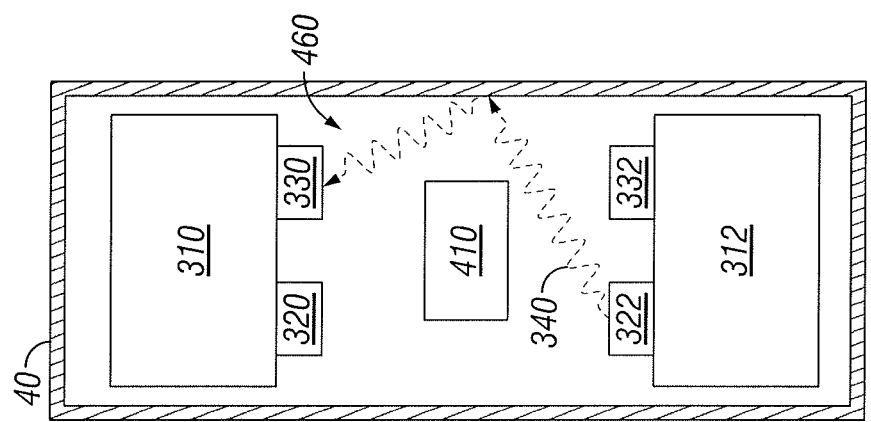
FIG. 4 is a diagram of an optical splash communication system, according to aspects of the present disclosure.

FIG. 4 illustrates another diagram of an optical splash communication system, according to aspects of the present disclosure. An element 410 partially obstructs the path of optical splash signal 340. Element 410 may be any type of obstruction, tools, component, device, material or other obstacle. The optical splash signal 340 is reflected from an inner surface or wall of the BHA 40 to electrical element 310. In one or more embodiments, the inner wall of a downhole tool or the BHA 40 is painted with a coating that reflects any light such as a specular and diffusive white reflective coating. An inner space 460 allows an optical splash signal 340 to be transmitted and received in free space between the electrical elements 310 and 312.

Figure 5:
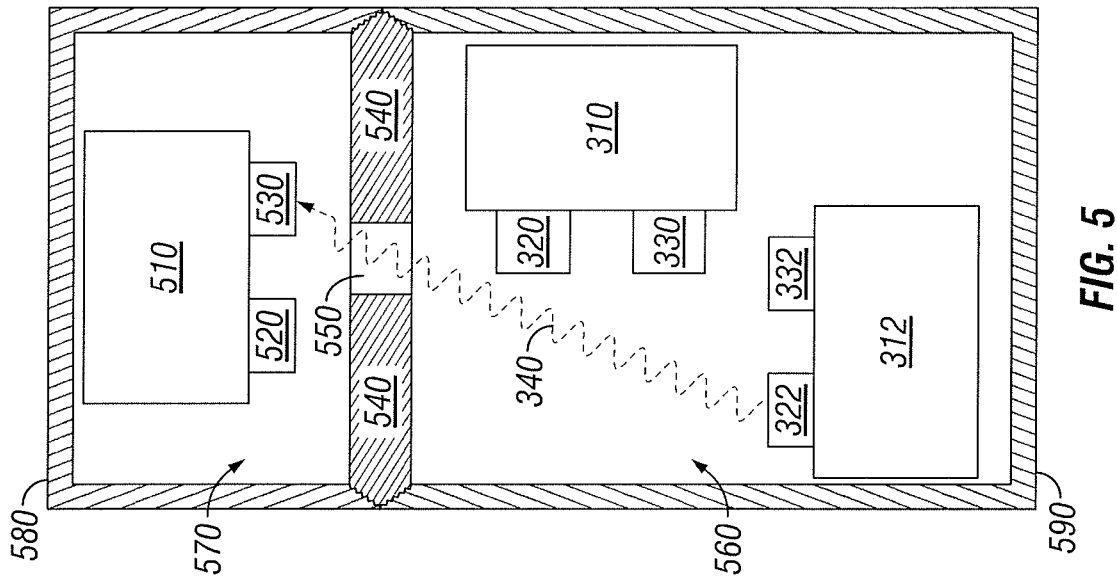
FIG. 5 is a diagram of an optical splash communication system, according to aspects of the present disclosure.

FIG. 5 is a diagram of an optical splash communication system, according to aspects of the present disclosure. Downhole tool 580 comprises electrical element 510 and downhole tool 590 comprises electrical elements 310 and 312. Downhole tools 580 and 590 may be coupled together via a coupler 540. The coupler 540 may comprise one or more electrical connections or terminals to electrically connect the downhole tools 580 and 590. The coupler 540 may be any type of component that joins or bonds the downhole tools 580 and 590. For example, the coupler 540 may be a high pressure hybrid connector. In one or more embodiments, the coupler 540 may be a plug and window that allows for the transmission of power (for example, electricity) to flow between the downhole tools 580 and 590.

The downhole tools 580 and 590 may have an opening 550 that permits an optical splash signal 340 to be transmitted and received in free space between any one or more of the electrical elements 310, 312, and 510. In one or more embodiments, the coupler 540 may comprise opening 550. For example, coupler 540 may be a plug with a window. The opening 550 may be an aperture, a hole, a window, a sealed transparent material (including, but not limited to, glass or sapphire) or any other type of opening that permits the optical splash signal 340 to be communicated between the downhole tools 590 and 580. For example, in one or more embodiments, to ensure a fluid-free or water-tight enclosure, the opening 550 creates a seal such that no drilling mud or other absorptive dirt within the formation 104, borehole 16, or any other downhole location penetrates any inner space such as, inner spaces 360, 460, 560 and 570, that the optical splash signal 340 travels.

The downhole tool 580 comprises an inner space 570 that surrounds the electrical element 510. Electrical element 510 may comprise a light source 520 and a detector 530. Downhole tool 590 may comprise an inner space 560 that surrounds the electrical elements 310 and 312. The optical splash signal 340 may be transmitted and received within any one or more of the inner spaces 570 and 560. Any one or more of the electrical elements 310, 312, and 510 may transmit or receive an optical splash 340. For example, in one embodiment, the light source 322 at electrical element 312 may directly transmit the optical splash signal 340 via free space through inner space 560, through the opening 550, through inner space 570 and to the detector 530. Likewise, bidirectional communication may be permitted such that light source 520 may transmit the optical splash signal 340 via free space through inner space 570, through the opening 550, and through inner space 560 to the detector 332. In one or more embodiments, the optical splash signal may be first transmitted to detector 330 of electrical element 310 from any other electrical element and then electrical element 310 may retransmit via light source 320 the optical splash signal to any other electrical element. In one or more embodiments, any one or more of electrical elements 510, 310, and 312 may communicate with each other.

In one or more embodiments, electrical elements 510, 310, and 312 may not be operable to communicate with any one or more of the other electrical elements. In one or more embodiments, electrical element 510 may only be operable to communicate (for example, transmit or receive optical light signal 340) with electrical element 310. In one or more embodiments, electrical element 312 may only be operable to communicate (for example, transmit or receive optical splash signal 340) with electrical element 310. In one or more embodiments, electrical element 310 may communicate with both electrical element 312 and electrical element 510 but electrical element 312 and electrical element 510 may not be operable to communicate with each other. In one or more embodiments, electrical elements 510, 310, and 312 may communicate data associated with one or more downhole sensors or receivers 110 via optical splash signal 340. Any one or more of electrical elements 310, 312, and 510 (as illustrated in FIGS. 3-5) may communicate or transmit the data to a downhole storage or to an information handling system 32, logging facility 44 or any other computing device.

In one or more embodiments, multiple electrical elements such as electrical elements 510, 310, and 312 may independently transmit data, for example, may transmit an optical splash signal 340 that carries data to one other electrical element. To prevent interference or to differentiate between the these independent transmissions, each electrical element may emit different colors of light. For example, electrical element 510 may comprise a light source 520 that emits a first color of light, electrical element 310 may comprise a light source 320 that emits a second color of light, and electrical element 312 may comprise a light source 322 that emits a third color of light. Besides using different colors of light, in one or more embodiments, interference may be eliminated by time division multiplexing, by using different subcarriers for the optical splash signal emitted, by any other suitable way, or any combination thereof.

Figure 6:
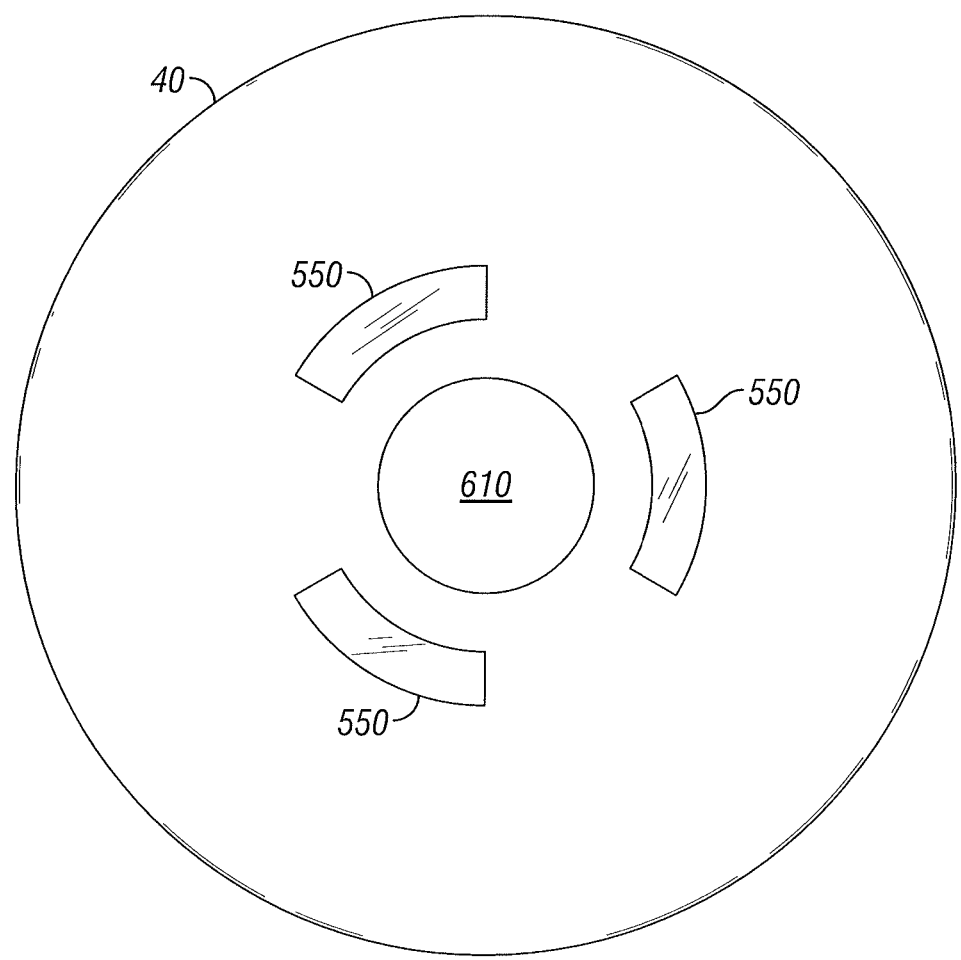
FIG. 6 is a diagram of an end portion of a downhole tool comprising an optical splash communication system, according to one or more aspects of the present invention.

FIG. 6 is a diagram of an end portion, a top or a bottom, of a downhole tool that comprises an optical splash communication system, according to one or more aspects of the present disclosure. In one embodiment, a downhole tool such as BHA 40 comprises one or more openings 550 and a rotational joint 610. The rotational joint 610 permits coupled downhole tools to rotate independently of the relative rotation of any other coupled downhole tool. For example, the alignment of any two or more downhole tools may be altered in relation to each other. As any one or more of the downhole tools are rotated, the openings 550 of each downhole tool may align in such a manner that a light, such as optical splash signal 340, may be transmitted or received between the downhole tools.

Figure 7:
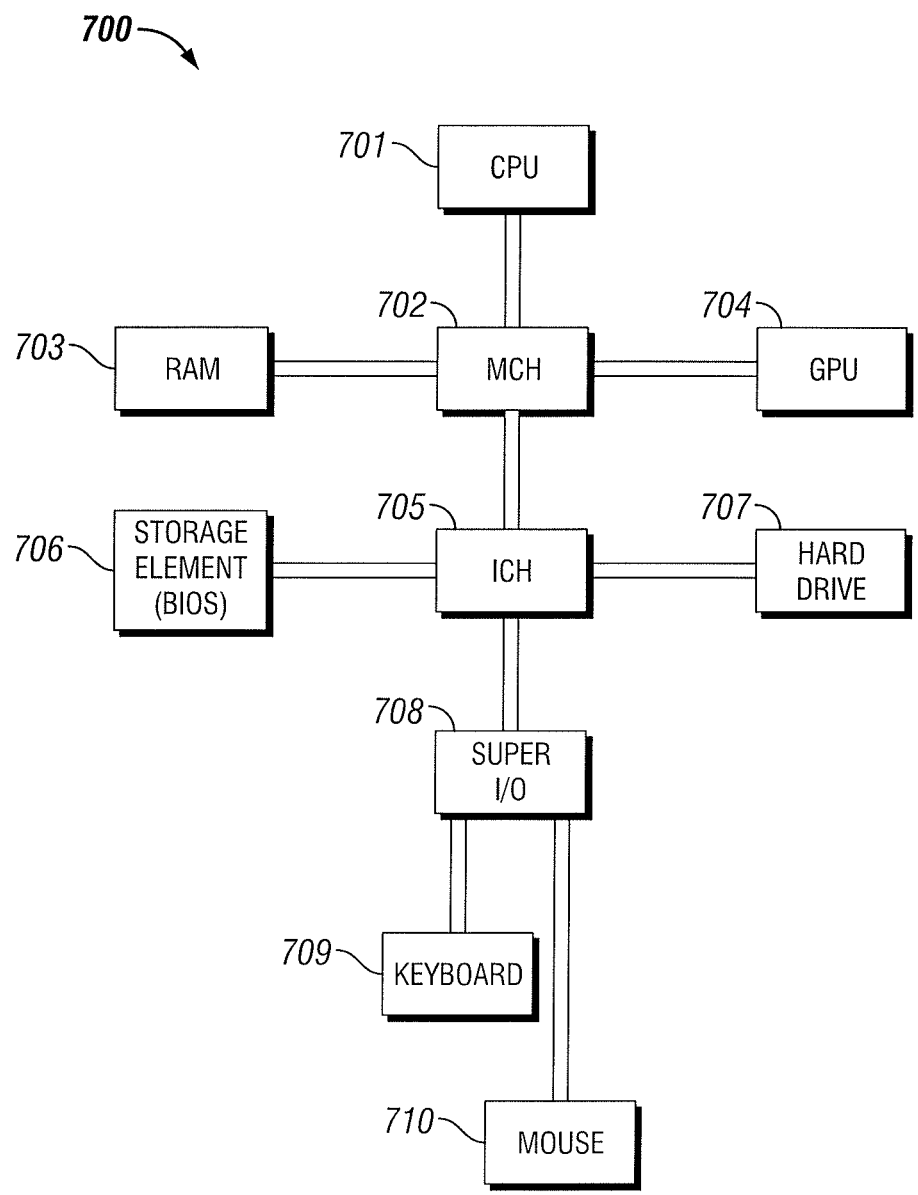
FIG. 7 is a diagram of an information handling system, according to one or more aspects of the present invention.

FIG. 7 is a diagram illustrating an example information handling system 700, according to aspects of the present disclosure. The information handling system 32 or the logging facility 44 may take a form similar to the information handling system 700. A processor or central processing unit (CPU) 701 of the information handling system 700 is communicatively coupled to a memory controller hub or north bridge 702. The processor 701 may include, for example a microprocessor, microcontroller, digital signal processor (DSP), application specific integrated circuit (ASIC), or any other digital or analog circuitry configured to interpret and/or execute program instructions and/or process data. Processor 701 may be configured to interpret and/or execute program instructions or other data retrieved and stored in any memory such as memory 703 or hard drive 707. Program instructions or other data may constitute portions of a software or application for carrying out one or more methods described herein. Memory 703 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 703 for execution by processor 701.

Modifications, additions, or omissions may be made to FIG. 7 without departing from the scope of the present disclosure. For example, FIG. 7 shows a particular configuration of components of information handling system 700. However, any suitable configurations of components may be used. For example, components of information handling system 700 may be implemented either as physical or logical components. Furthermore, in some embodiments, functionality associated with components of information handling system 700 may be implemented in special purpose circuits or components. In other embodiments, functionality associated with components of information handling system 700 may be implemented in configurable general purpose circuit or components. For example, components of information handling system 700 may be implemented by configured computer program instructions.

Memory controller hub 702 may include a memory controller for directing information to or from various system memory components within the information handling system 700, such as memory 703, storage element 706, and hard drive 707. The memory controller hub 702 may be coupled to memory 703 and a graphics processing unit 704. Memory controller hub 702 may also be coupled to an I/O controller hub or south bridge 705. I/O hub 705 is coupled to storage elements of the information handling system 700, including a storage element 706, which may comprise a flash ROM that includes a basic input/output system (BIOS) of the computer system. I/O hub 705 is also coupled to the hard drive 707 of the information handling system 700. I/O hub 705 may also be coupled to a Super I/O chip 708, which is itself coupled to several of the I/O ports of the computer system, including keyboard 709 and mouse 710.

Figure 9:
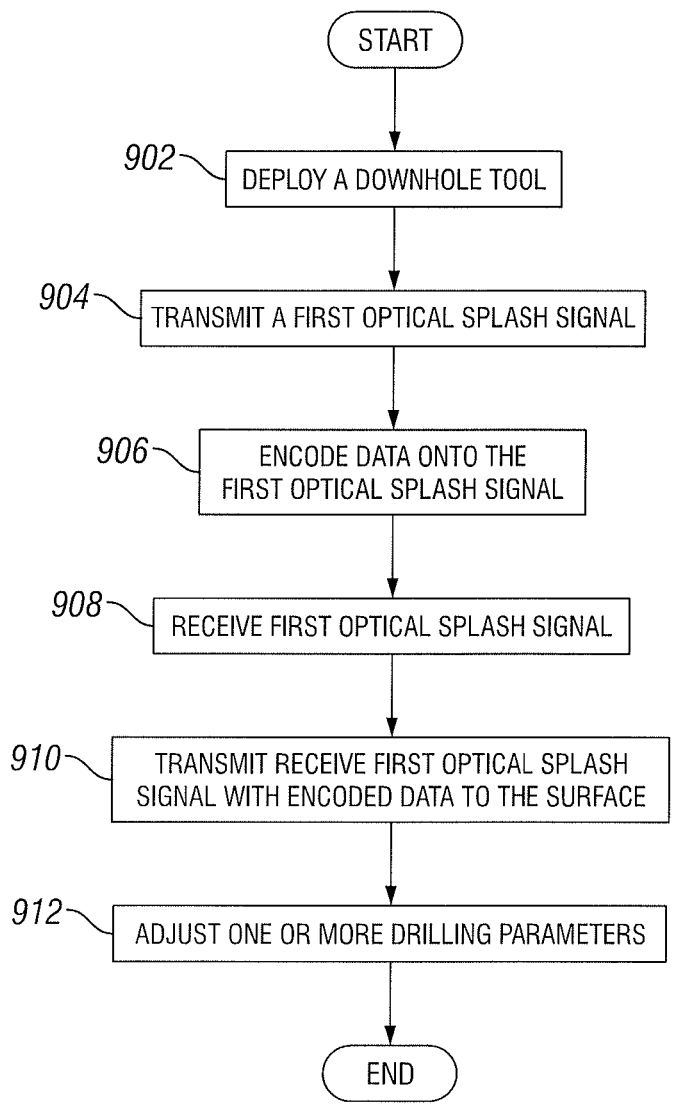
FIG. 9 is a flow diagram for an optical communication system, according to one or more aspects of the present invention.

FIG. 9 illustrates a flow diagram for an optical splash communication system according to one or more aspects of the present invention. At step 902, a downhole tool is deployed or positioned downhole, for example, within a borehole 16 in subterranean formation 104. The downhole tool may comprise a plurality of electrical elements, for example, electrical elements 310, 312, or 510. In one or more embodiments, the electrical elements may be configured as illustrated in FIGS. 3-5 or any other suitable configuration.

At step 904, a first electrical element transmits a first optical splash signal via free space into an inner space, for example, an inner space 360, 460, 560, or 570. The inner space may be any one or more inner spaces and the inner spaces may be positioned within in any one or more downhole tools. When the first optical splash signal is transmitted between an inner space of multiple downhole tools, the downhole tools may be coupled together in such a manner as to permit the first optical splash signal to be transmitted between the downhole tools. At step 906, digital downhole data is encoded onto the first optical splash signal. For example, data from one or more receivers or sensor deployed downhole, for example, as part of the downhole tool, are received and this data is encoded onto the first optical splash signal.

At step 908, the first optical splash signal is received via free space at the second electrical element. The first optical splash signal may be received directly from the first electrical element, via third electrical element or after bouncing off of an inner surface of any one or more downhole tools. At step 910, the encoded digital downhole data is transmitted to the surface 102, for example, to an information handling system 32 via the first optical splash signal. At step 912, any one or more drilling parameters are adjusted. In one or more embodiments, the adjustment may be based, at least in part, on the encoded digital downhole data. In one or more embodiments, the information handling system 32 may communicate a command to the downhole tool or any other downhole component to adjust any one or more drilling parameters.

In one or more embodiments, at least one downhole tool is positioned within a borehole in a subterranean formation, wherein the at least one downhole tool comprises at least one inner space in which a first electrical element and a second electrical element are positioned. A first optical splash signal is transmitted from the first electrical element via free space into the at least one inner space and the first optical splash signal is received via free space at the second electrical element.

In one or more embodiments, the at least one downhole tool comprises a single downhole tool comprising a single inner space in which the first electrical element and the second electrical element are positioned. In one or more embodiments, the at least one downhole tool comprises a first downhole tool with a first inner space and a second downhole tool with a second inner space, the first electrical element is positioned within the first inner space, e second electrical element is positioned within the second inner space, and the first and second downhole tools comprise at least one opening to facilitate transmission of the first optical flash signal from the first inner space to the second inner space. In one or more embodiments, the at least one opening comprises at least one sealed window in the first downhole tool and at least one sealed window in the second downhole tool. In one or more embodiments, the at least one sealed window in the first downhole tool and at least one sealed window in the second downhole tool are positioned to align when the first downhole tool and the second downhole tool rotate with respect to one another.

In one or more embodiments, the first optical splash signal is retransmitted as a second optical splash signal into the at least one inner space from the second electrical element and the second optical splash signal is received at a third electrical element positioned within the at least one inner space. In one or more embodiments, the first optical splash signal comprises visible light.

In one or more embodiments, a downhole tool comprises a first electrical element, a second electrical element, wherein the first electrical element and the second electrical element are positioned within at least one inner space, and a first optical splash signal, wherein the first optical splash signal is transmitted from the first electrical element into the at least one inner space to the second electrical element via free space. In one or more embodiments, the at least one downhole tool comprises a single downhole tool comprising a single inner space in which the first and second electrical elements are positioned. In one or more embodiments, the downhole tool further comprises at least one opening, wherein the at least one downhole tool comprises a first downhole tool with a first inner space and a second downhole tool with a second inner space, wherein the first electrical element is positioned within the first inner space, wherein the second electrical element is positioned within the second inner space, and wherein the first downhole tool and the second downhole tool comprise the at least one opening to facilitate transmission of the first optical splash signal from the first inner space to the second inner space. In one or more embodiments, the at least one opening comprises at least one sealed window in the first downhole tool and at least one sealed window in the second downhole tool. In one or more embodiments, the at least one sealed window in the first downhole tool and at least one sealed window in the second downhole tool are positioned to align when the first downhole tool and the second downhole tool rotate with respect to one another.

In one or more embodiments the downhole tool further comprises a third electrical element positioned within the at least one inner space, wherein the third electrical element receives a second optical splash signal, wherein the second optical flash signal comprises a retransmission of the first optical splash signal into the at least one inner space from the second electrical element. In one or more embodiments, the first electrical element comprises a first detector and a first light source, the second electrical element comprises a second detector and a second light source, the first light source generates the first optical splash signal and the second detector receives the first optical splash signal.

In one or more embodiments, downhole data is communicated between elements of a downhole tool by deploying a downhole tool downhole, wherein the downhole tool comprises a first electrical element and a second electrical element, maintaining bidirectional communication between the first electrical element and the second electrical element via a first optical splash signal, encoding digital downhole data from one or more receivers of the downhole tool in the first optical splash signal, transmitting the first optical splash signal, from the first electrical element to the second electrical element, via free space into at least one inner space, wherein the first electrical element and the second electrical element are disposed within the at least one inner space, transmitting the encoded digital downhole data via the first optical splash signal to an information handling system, and adjusting one or more drilling parameters based, at least in part, on the encoded digital downhole data transmitted via the first optical splash signal. In one or more embodiments, the encoding the digital downhole data comprises quadrature amplitude modulation.

In one or more embodiments, the method of communicating downhole data between elements of a downhole tools further comprises receiving a second optical splash signal by the third electrical element, via free space into the at least one inner space, wherein the first electrical element, the second electrical element, and the third electrical element are disposed within the at least one inner space and differentiating the second optical splash signal from the first optical splash signal to ensure that the first optical splash signal does not interfere with the second optical splash signal. In one or more embodiments, transmitting the first optical splash signal comprises reflecting the first optical splash signal by an inner wall of the downhole tool. In one or more embodiments, the method of communicating downhole data between elements of a downhole tools further comprises rotating a rotational joint, wherein the downhole tool comprises a first downhole tool and a second downhole tool, wherein rotating the rotational joint alters an alignment of the first downhole tool in relation to the second downhole tool, and wherein the first optical splash signal is transmitted through an opening between the first downhole tool and the second downhole tool. In one or more embodiments, the first electrical element comprises a first light source and a first detector, wherein the second electrical element comprises a second light source and a second detector, wherein the first optical splash signal is generated by a first light source of the first electrical element, and wherein the first optical splash signal is received by a second detector of the second electrical element.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method, comprising
    positioning a first downhole tool within a borehole in a subterranean formation, wherein the first downhole tool comprises a first inner space in which a first electrical element and a second electrical element are positioned;
    transmitting, from a light source of the first electrical element, an optical splash signal via free space into the first inner space; and
    receiving the optical splash signal via the free space at a detector of the second electrical element, wherein
        the first downhole tool is coupled to a second downhole tool within the borehole;
        the second downhole tool comprising a third electrical element positioned within a second inner space of the second downhole tool; and
        at least one opening is provided between the first downhole tool and the second downhole tool to facilitate transmission of the optical splash signal from at least one of the first electrical element or the second electrical element to the third electrical element of the second downhole tool.

2. The method of claim 1, wherein the at least one opening comprises at least one sealed window in the first downhole tool and at least one sealed window in the second downhole tool.

3. The method of claim 2, wherein the at least one sealed window in the first downhole tool and at least one sealed window in the second downhole tool are positioned to align when the first downhole tool and the second downhole tool rotate with respect to one another.

4. The method of claim 1, further comprising
    retransmitting the optical splash signal as another optical splash signal into the first inner space from the second electrical element; and
    receiving the other optical splash signal at a fourth electrical element positioned within the first inner space.

5. The method of claim 1, wherein the first optical splash signal comprises visible light.

6. A first downhole tool, comprising
a first electrical element;
a second electrical element, wherein the first electrical element and the second electrical element are positioned within a first inner space; and
an optical splash signal, wherein the optical splash signal is transmitted from a light source of the first electrical element into the first inner space to a detector of the second electrical element via free space, wherein
the first downhole tool is coupled to a second downhole tool;
the second downhole tool comprising a third electrical element positioned within a second inner space of the second downhole tool; and
at least one opening is provided between the first downhole tool and the second downhole tool to facilitate transmission of the optical splash signal from at least one of the first electrical element or the second electrical element to the third electrical element of the second downhole tool.

7. The first downhole tool of claim 6, wherein the at least one opening comprises at least one sealed window in the first downhole tool and at least one sealed window in the second downhole tool.

8. The first downhole tool of claim 7, wherein the at least one sealed window in the first downhole tool and at least one sealed window in the second downhole tool are positioned to align when the first downhole tool and the second downhole tool rotate with respect to one another.

9. The first downhole tool of claim 6, further comprising:
a fourth electrical element positioned within the first inner space, wherein the fourth electrical element receives another optical splash signal, wherein the other optical splash signal comprises a retransmission of the optical splash signal into the first inner space from the second electrical element.

10. The downhole tool of claim 6, wherein:
the first electrical element comprises a second detector; and
the second electrical element comprises a second light source.

11. A method for communicating downhole data between elements of a downhole tool, comprising:
deploying a first downhole tool downhole, wherein the first downhole tool comprises a first electrical element and a second electrical element;
maintaining bidirectional communication between the first electrical element and the second electrical element via an optical splash signal;
encoding digital downhole data from one or more receivers of the downhole tool in the optical splash signal;
transmitting the optical splash signal, from a light source of the first electrical element to a detector of the second electrical element, via free space into a first inner space, wherein the first electrical element and the second electrical element are disposed within the first inner space;
transmitting the encoded digital downhole data via the optical splash signal to an information handling system; and
adjusting one or more drilling parameters based, at least in part, on the encoded digital downhole data transmitted via the optical splash signal, wherein
the first downhole tool is coupled to a second downhole tool within the borehole;
the second downhole tool comprising a third electrical element positioned within a second inner space of the second downhole tool; and
at least one opening is provided between the first downhole tool and the second downhole tool to facilitate transmission of the optical splash signal from at least one of the first electrical element or the second electrical element to the third electrical element of the second downhole tool.

12. The method of claim 11, wherein encoding the digital downhole data comprises quadrature amplitude modulation.

13. The method of claim 11, further comprising:
receiving another optical splash signal, by a fourth electrical element, via the free space into the first inner space, wherein the first electrical element, the second electrical element, and the fourth electrical element are disposed within the first inner space; and
differentiating the other optical splash signal from the optical splash signal to ensure that the optical splash signal does not interfere with the other optical splash signal.

14. The method of claim 11, wherein transmitting the optical splash signal comprises reflecting the optical splash signal by an inner wall of the first downhole tool.

15. The method of claim 11, further comprising:
rotating a rotational joint, wherein rotating the rotational joint alters an alignment of the first downhole tool in relation to the second downhole tool.

16. The method of claim 11, wherein the first electrical element comprises a second detector, and wherein the second electrical element comprises a second light source.

* * * * *